United States Patent
Girish

(10) Patent No.: US 10,255,490 B2
(45) Date of Patent: Apr. 9, 2019

(54) METHOD AND APPARATUS FOR HUMAN DETECTION IN IMAGES

(71) Applicant: Sasken Communication Technologies Ltd, Bangalore (IN)

(72) Inventor: Banavathi Venkata Subba Girish, Bangalore (IN)

(73) Assignee: SASKEN COMMUNICATION TECHNOLOGIES LTD, Karnataka (IN)

( * ) Notice: Subject to any disclaimer, the term of this patent is extended or adjusted under 35 U.S.C. 154(b) by 0 days.

(21) Appl. No.: 15/469,559

(22) Filed: Mar. 26, 2017

(65) Prior Publication Data

US 2018/0157904 A1 Jun. 7, 2018

(30) Foreign Application Priority Data

Dec. 1, 2016 (IN) .............................. 201641041087

(51) Int. Cl.
| | |
|---|---|
| G06K 9/00 | (2006.01) |
| G06T 5/50 | (2006.01) |
| G06K 9/40 | (2006.01) |
| G06T 7/11 | (2017.01) |
| G06K 9/62 | (2006.01) |
| G06N 3/08 | (2006.01) |
| G06K 9/46 | (2006.01) |
| G06N 3/04 | (2006.01) |

(52) U.S. Cl.
CPC .......... G06K 9/00362 (2013.01); G06K 9/40 (2013.01); G06K 9/4604 (2013.01); G06K 9/6256 (2013.01); G06N 3/08 (2013.01); G06T 5/50 (2013.01); G06T 7/11 (2017.01); *G06N 3/0454* (2013.01); *G06T 2207/20224* (2013.01); *G06T 2207/30196* (2013.01)

(58) Field of Classification Search
CPC .... G06K 9/00362; G06K 9/40; G06K 9/4604; G06K 9/6256; G06T 7/11; G06T 5/50; G06N 3/08
USPC ......................................................... 382/156
See application file for complete search history.

(56) References Cited

U.S. PATENT DOCUMENTS 5,987,154 A * 11/1999 Gibbon .............. G06K 9/00261
 382/115
8,045,759 B2 * 10/2011 Mizutani ............ G06K 9/00362
 382/103

(Continued)

*Primary Examiner* — Van D Huynh

(57) ABSTRACT

The present invention relates to a method and apparatus for human detection in images taken from a surveillance camera. In one embodiment, the method comprises subtracting a current image from a baseline image to obtain a delta image, said delta image comprising at least one object; filtering stray noises and/or noise clusters from said delta image; marking and traversing the boundary of said at least one object; determining the at least one object as valid object: if a length traversed along the boundary of said at least one object is greater than a pre-determined threshold value; and if an interior region of said at least one object is detected as being solid; erasing the interior region of said at least one object and determining one or more pre-determined points on the boundary of said valid object; determining one or more pre-determined parameters corresponding to said pre-determined points and ratio thereof; processing the ratios to identify if the object is a human being or not.

14 Claims, 9 Drawing Sheets

(56) References Cited

U.S. PATENT DOCUMENTS

| | | | | |
|---|---|---|---|---|
| 9,652,677 B2* | 5/2017 | Umezaki | ............... | G08G 1/166 |
| 2005/0147277 A1* | 7/2005 | Higaki | ............... | G06K 9/00362 |
| | | | | 382/103 |
| 2013/0251203 A1* | 9/2013 | Tanabiki | ............ | G06K 9/00369 |
| | | | | 382/103 |
| 2014/0139660 A1* | 5/2014 | Zhu | ................... | G06K 9/00369 |
| | | | | 348/143 |
| 2017/0257604 A1* | 9/2017 | Fujii | ..................... | H04N 7/183 |

* cited by examiner

FIG. 3 (a)
FIG. 3 (b)
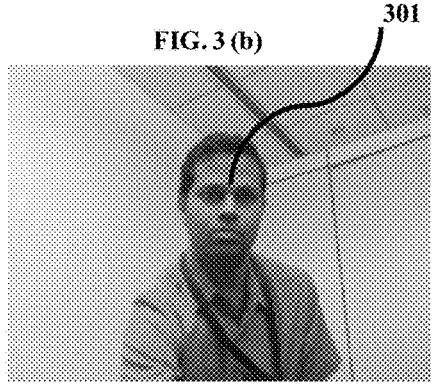
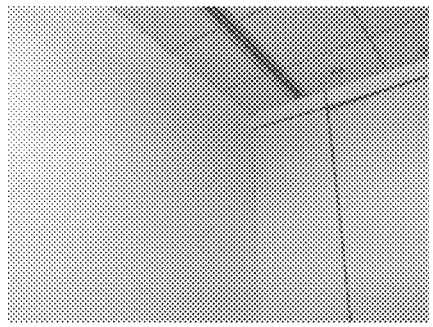
FIG. 3 (c)
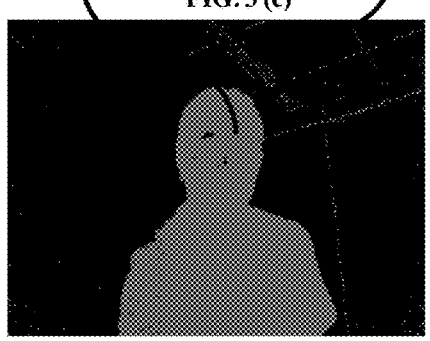
FIG. 3 (c)
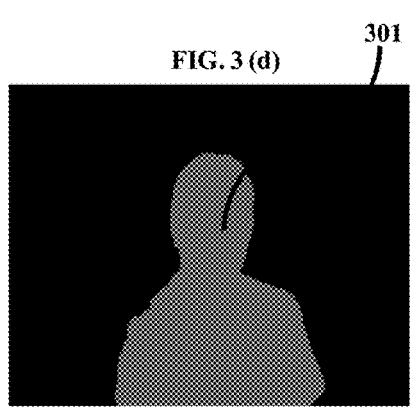
FIG. 3 (d)
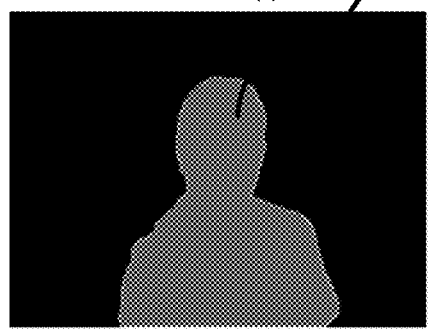
FIG. 3 (e)
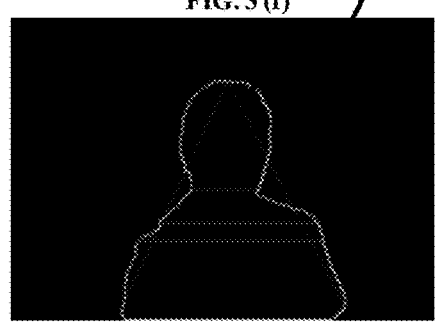
FIG. 3 (f)

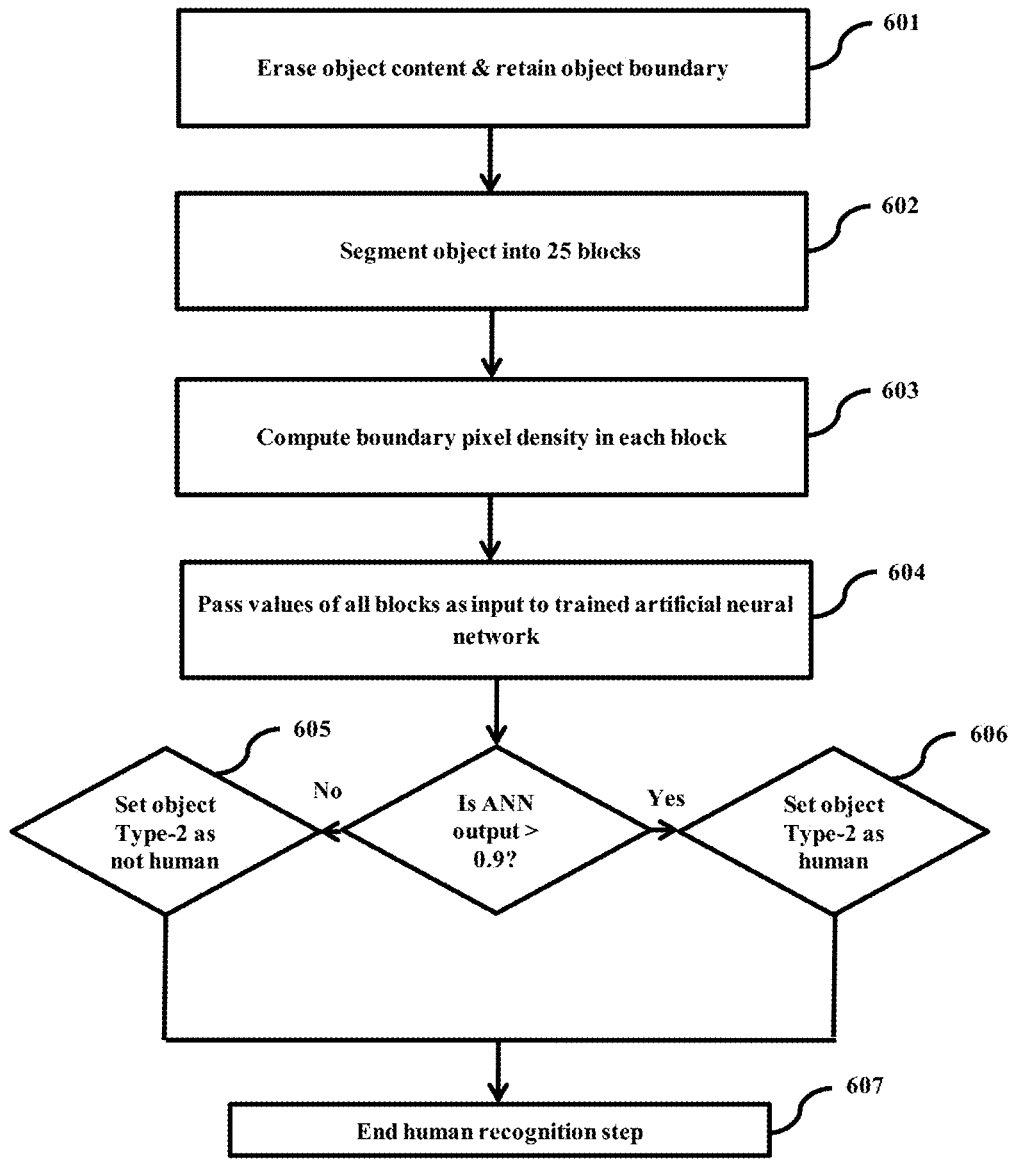

METHOD AND APPARATUS FOR HUMAN DETECTION IN IMAGES

TECHNICAL FIELD

The present invention relates to a method and apparatus for human detection in images taken from a surveillance camera. The present application is based on, and claims priority from an Indian Application Number 201641041087 filed on 1 Dec. 2016, the disclosure of which is hereby incorporated by reference.

BACKGROUND

There are a number of method and apparatus for object detection and human recognition, but a robust solution for general human detection when the face is not visible and in varied conditions remains elusive.

U.S. Pat. No. 6,697,502 B2 discloses a digital image processing method for detecting human figures in a digital color image, comprising the steps of: providing a digital color image having pixels representing RGB values; segmenting the image into non-overlapping regions of homogeneous color or texture; detecting candidate regions of human skin color; detecting candidate regions of human faces; and for each candidate face region, constructing a human figure by grouping regions in the vicinity of the face region according to a pre-defined graphical model of the human figure, giving priority to human skin color regions. As can be seen, the said method relies on visibility of face and skin color as a pre-requisite. The said method however discloses the advantage that clothed, unknown figures can be more reliably detected in the digital image.

U.S. Pat. No. 8,228,382 B2 discloses a system and method for detecting and counting people in a specified area. The method assumes that the head is elliptical in shape with a width of X and height of 1.5X and once detected, the skin color analysis is done on this shape.

US20070237387 A1 discloses a method and system for detecting humans in images of a scene acquired by a camera. Gradients of pixels in the image are determined and sorted into bins of a histogram. An integral image is stored for each bin of the histogram. Features are extracted from the integral images, the extracted features corresponding to a subset of a substantially larger set of variably sized and randomly selected blocks of pixels in the test image. The features are applied to a cascaded classifier to determine whether the test image includes a human or not.

US20130251203 A1 discloses a person detection device with which it is possible to estimate a state of a part of a person from an image. A person detection device comprises: an evaluation unit which acquires a prescribed outline of a person from an evaluation image; and a shoulder position calculation unit and an orientation estimation unit which estimate a state of a prescribed part of a person which is included in the evaluation image from the prescribed outline of the person which is acquired from the evaluation image, on the basis of an estimation model which denotes a relation between the prescribed outline and the state of the prescribed part of the person.

US20140139660 A1 describes the method and apparatus for detecting people by confirming an omega shape for head and shoulder. The omega shape is determined by first finding convex hull points on right and left parts using Graham Scan, thereafter finding the head and shoulder points and subsequently finding the neck points on each side.

US20130243259 A1 describes the method and apparatus for object detection of information regarding object having joints. For the omega shape, it first generates a distance histogram along the Y-axis of the omega shape. Thereafter, by applying a pre-determined threshold on the distance histogram, the shoulder part is eliminated and the head part remains. From this, the centre of the head is calculated and a pre-determined ratio or body constraint information is used to calculate the shoulder points on each side.

From the above mentioned, it is clear that some prior art methods rely on the visibility of face or skin as a pre-requisite for detection of human images. Other prior art methods uses shape i.e. omega shape as key differentiating factors for humans. The existing prior art methods do not seem to address the non-ideal scenarios that includes imperfect positions and asymmetric shape that are available from a live image, as the human could be at different angles with respect to a surveillance camera and the outline obtained may not be perfect depending on the lighting and the background conditions.

The present invention aims to overcome the disadvantages of the prior art. The present invention is based on shape of the upper body comprising head and the upper torso, which is omega shape and the methods are developed to address various non-idealistic conditions. It includes scenarios where the front of the human is facing the camera or the side or back of the human is facing the camera. It takes into account tilted head, shoulder asymmetry and the fact that human in the intended scenarios may not be standing upright. Hence, the method and apparatus of the present invention overcomes the disadvantages mentioned in the prior art and have the ability to address non-ideal scenarios more robustly.

SUMMARY

In accordance with the purposes of the invention, the present invention as embodied and broadly described herein, discloses a computer-implemented method for human detection in images comprising: subtracting a current image from a base image to obtain a delta image, said delta image comprising at least one object; filtering stray noises and/or noise clusters from said delta image; marking and traversing the boundary of said at least one object; determining the at least one object as valid object: if a length traversed along the boundary of said at least one object is greater than a pre-determined threshold value and if an interior region of said at least one object is detected as being solid; erasing the interior region of said at least one object and determining one or more pre-determined points on the boundary of said valid object; determining one or more pre-determined parameters corresponding to said pre-determined points and ratio thereof; and processing the ratios to identify if the object is a human being or not.

The present invention further discloses another computer-implemented method for human detection in images comprising: subtracting a current image from a base image to obtain a delta image, said delta image comprising at least one object; filtering stray noises and/or noise clusters from said delta image; marking and traversing the boundary of said at least one object; determining the at least one object as valid object: if a length traversed along the boundary of said at least one object is greater than a pre-determined threshold value and if an interior region of said at least one object is detected as solid; erasing the interior region of said valid object and segmenting the boundary of said valid object into a pre-determined number of blocks; and extracting and processing the boundary features of said valid object to identify if the object is a human being or not.

The present invention further discloses an apparatus for human detection in images, said apparatus comprising a processor, an Input/output (I/O) interface coupled to the processor, and a memory coupled to the processor comprising a plurality of modules capable of being executed by the processor. The plurality of modules may comprise: a camera interface control module, a baseline image storage module, a background subtraction module, a noise filter module, an object detection module, a first human recognition module and/or a second recognition module and a decision section.

These and other aspects will be more clearly understood from the following detailed description taken in conjugation with the accompanying drawings and claims.

BRIEF DESCRIPTION OF THE DRAWINGS

To further clarify advantages and aspects of the invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings in accordance with various embodiments of the invention, wherein:

FIGS. 3 (a)-3(f) illustrates an example implementation of the present invention;

FIG. 6 illustrates the step of human detection, in accordance with step 206 and 207 of method 200 of the present invention;

Figure 1:
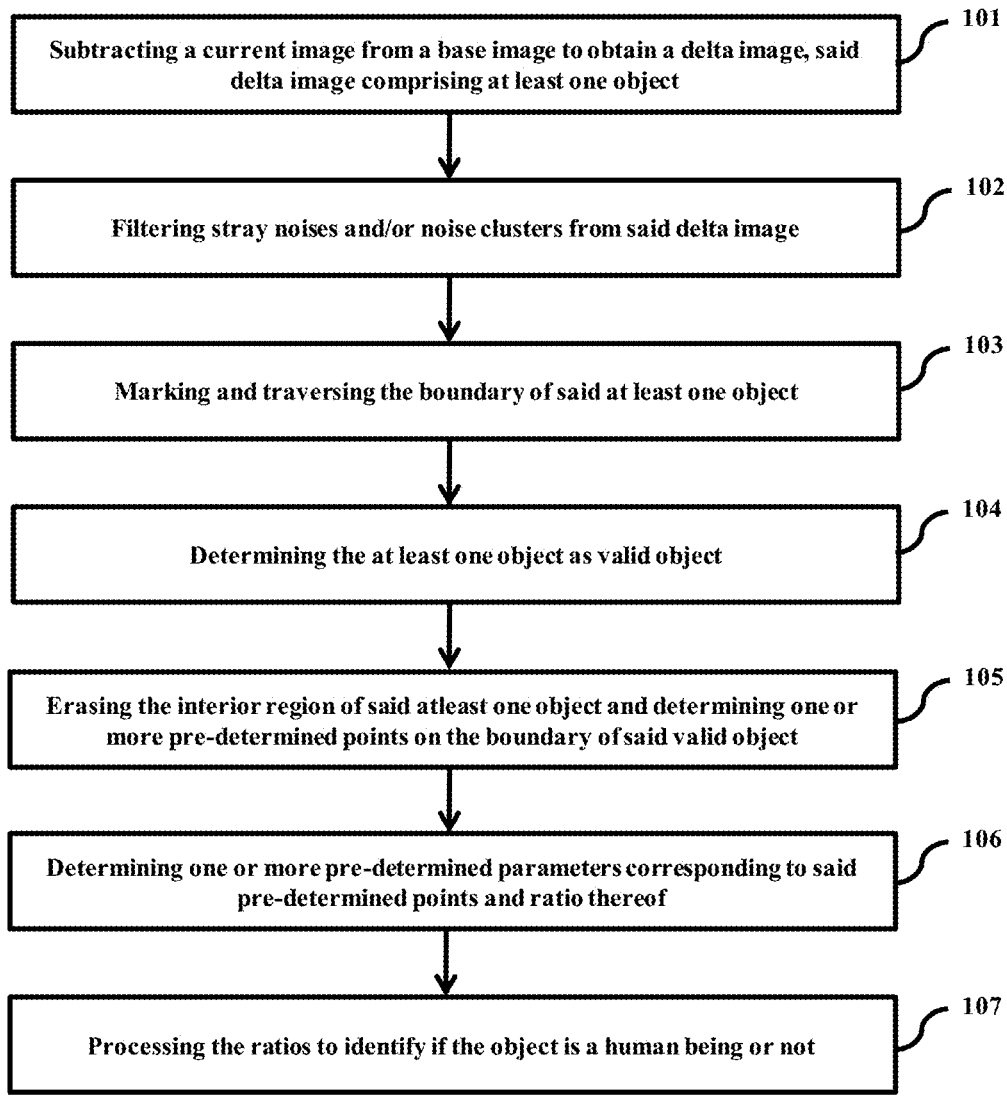
FIG. 1 illustrates a computer-implemented method 100 for human detection in images, in accordance with an embodiment of the present invention.

It may be noted that to the extent possible, like reference numerals may have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the invention. Furthermore, the one or more elements may have been represented in the drawings by conventional symbols, and the drawings may show only those specific details that are pertinent to understanding the embodiments of the invention so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Throughout the document, the terms block, section and module are used interchangeably.

FIG. 1 illustrates a computer-implemented method 100 for human detection in images, in accordance with an embodiment of the present invention.

At step 101, the method comprises subtracting a current image from a base image to obtain a delta image, said delta image comprising at least one object. In an embodiment, a background subtraction module (not shown) is configured to subtract a current image from a base image to obtain a delta image. At step 102, the method comprises filtering stray noises and/or noise clusters from said delta image. In an embodiment, a noise filter module (not shown) is configured to filter stray noises and/or noise clusters from said delta image. At step 103, the method comprises marking and traversing the boundary of said at least one object. In an embodiment, an object detection module (not shown) is configured to mark and traverse the boundary of the at least one object. At step 104, the method comprises determining the at least one object as valid object: if a length traversed along the boundary of said at least one object is greater than a pre-determined threshold value; and if an interior region of said at least one object is detected as being solid. In an embodiment, the object detection module is configured to determine the at least one object as valid object. At step 105, the method comprises erasing the interior region of said at least one object and determining one or more pre-determined points on the boundary of said valid object. In one example, the pre-determined points mentioned are from a group comprising: top of a head, right and left neck points, right and left shoulder points and maximum and minimum head points on X axis. In an embodiment, a human recognition block (not shown) is configured to erase the interior region of said at least one object and determining one or more pre-determined points on the boundary of said valid object. At step 106, the method comprises determining one or more pre-determined parameters corresponding to said pre-determined points and ratio thereof. In an embodiment, the human recognition block is configured to determine one or more pre-determined parameters corresponding to said pre-determined points and ratio thereof. At step 107, the method comprises processing the ratios to identify if the object is a human being or not. In one example, the pre-determined parameters are from a group comprising: width of a neck, width of a shoulder, height from a shoulder to top of a head, width of a head and height from neck to top of a head. In an embodiment, the human recognition block and a decision module (not shown) are configured to process the ratios to identify if the object is a human being or not.

In an embodiment, the aforementioned block and modules are present in the processor (not shown) to execute the method 100.

The step of subtracting at step 101 may comprise assigning, based on a pre-determined threshold value, pixels in the delta image a zero or a valid constant value. In one example, said pre-determined threshold value is 25 for $\Delta R/\Delta G/\Delta B$ component individually or 50 for the cumulative value of pixel ($\Delta R+\Delta G+\Delta B$). The step of filtering stray noises at step 102 may comprise determining, for each non-zero pixel of the delta image, number of neighbouring pixels having a non-zero pixel value and setting said non-zero pixel to a zero value if number of neighbouring pixels having a non-zero value is less than a pre-determined value. In one example, said pre-determined value is 2. The step of filtering noise clusters at step 102 further comprises: determining the zero pixel density in a gap between two adjacent objects; comparing the zero pixel density in the gap with a pre-determined minimum gap threshold value; determining the height or width of the object at end points of the gap; altering the value of pixels in the object from a non-zero value to a zero value if the height or width of the object at end points of the gap is less than a pre-determined minimum object threshold value and zero pixel density is greater than the pre-determined gap threshold value. In one example, the pre-determined minimum gap threshold value is 4. The step of marking and traversal at step 103 comprises: determining extrema pixels of the at least one object on X axis and Y axis; and marking a starting point from among said extrema pixels and traversing along the boundary of said at least one object to return to the starting point. The step of identifying if an interior region of said at least one object is detected as solid comprises: identifying extrema pixels of the at least one object on X axis and Y axis; identifying at least two successive pixels for each extrema pixel inside said at least one object along the respective X and Y axis; identifying at least one neighbouring pixel for each extreme pixel outside said at least object along the respective X and Y axis; determining the at least one object as valid object: if out of four neighbouring pixels inside the candidate object, at least one pixel has a non-zero value; and if out of two neighbouring pixels outside the candidate object, at least one pixel has a zero value.

Figure 2:
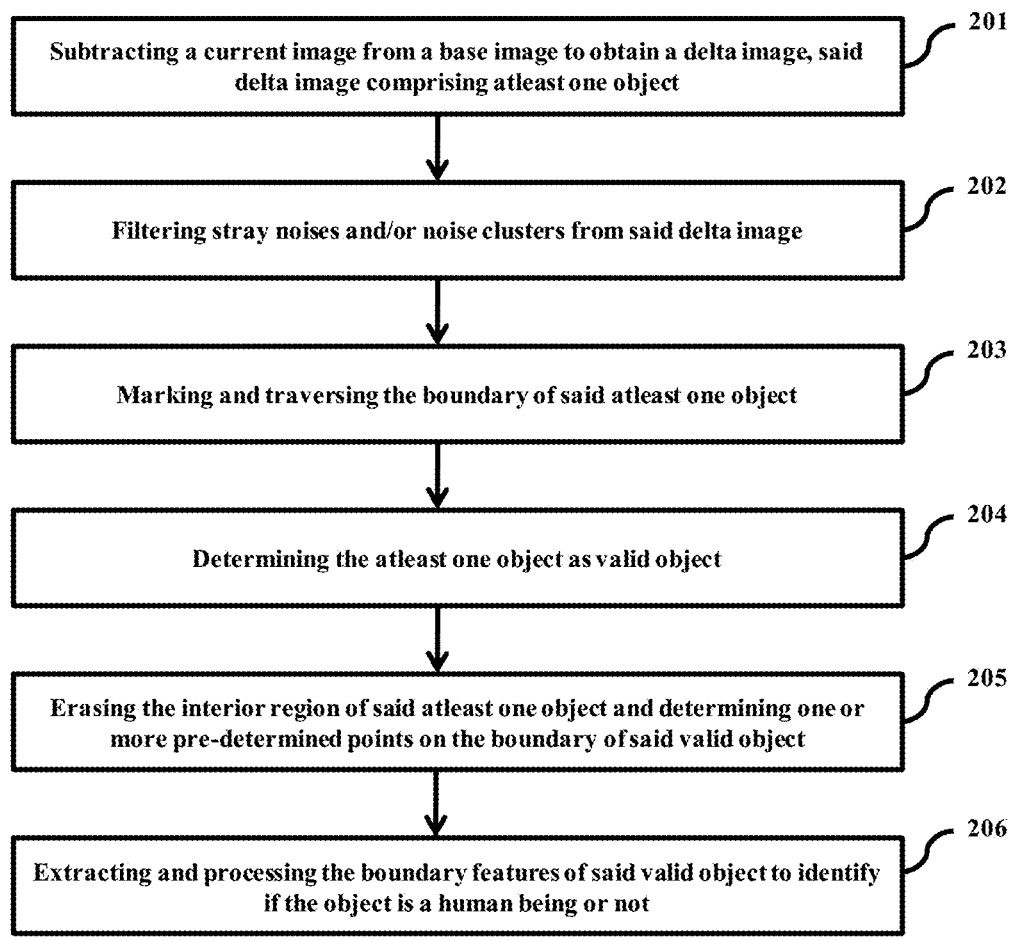
FIG. 2 illustrates a computer-implemented method 200 for human detection in images, in accordance with another embodiment of the present invention.

It is to be understood that prior to the step of subtracting; the method comprises receiving of a base image and receiving a current image. The base image is stored in the storage module of the apparatus FIG. 2 illustrates a computer-implemented method 200 for human detection in images, in accordance with another embodiment of the present invention.

At step 201, the method comprises subtracting a current image from a base image to obtain a delta image, said delta image comprising at least one object. At step 202, the method comprises filtering stray noises and/or noise clusters from said delta image. At step 203, the method comprises marking and traversing the boundary of said at least one object. At step 204, the method comprises determining the at least one object as valid object: if a length traversed along the boundary of said at least one object is greater than a pre-determined threshold value; and if an interior region of said at least one object is detected as solid. At step 205, the method comprises erasing the interior region of said valid object and segmenting the boundary of said valid object into a pre-determined number of blocks. At step 206, the method comprises extracting and processing the boundary features of said valid object to identify if the object is a human being or not.

The step of subtracting at step 201 may comprise assigning, based on a pre-determined threshold value, pixels in the delta image a zero or a valid constant value. In one example, said pre-determined threshold value is 25 for ΔR/ΔG/ΔB component individually or 50 for the cumulative value of pixel (ΔR+ΔG+ΔB). The step of filtering stray noises at step 202 may comprise determining, for each non-zero pixel of the delta image, number of neighbouring pixels having a non-zero pixel value and setting said non-zero pixel to a zero value if number of neighbouring pixels having a non-zero value is less than a pre-determined value. In one example, said pre-determined value is 2. The step of filtering noise clusters at step 202 further comprises: determining the zero pixel density in a gap between two adjacent objects; comparing the zero pixel density in the gap with a pre-determined minimum gap threshold value; determining the height or width of the object at end points of the gap; altering the value of pixels in the object from a non-zero value to a zero value if the height or width of the object at end points of the gap is less than a pre-determined minimum object threshold value and zero pixel density is greater than the pre-determined gap threshold value. In one example, the pre-determined minimum gap threshold value is 4. The step of marking and traversal at step 203 comprises: determining extrema pixels of the at least one object on X axis and Y axis; and marking a starting point from among said extrema pixels and traversing along the boundary of said at least one object to return to the starting point. The step of identifying if an interior region of said at least one object is detected as solid comprises: identifying extrema pixels of the at least one object on X axis and Y axis; identifying at least two successive pixels for each extrema pixel inside said at least one object along the respective X and Y axis; identifying at least one neighbouring pixel for each extreme pixel outside said at least object along the respective X and Y axis; determining the at least one object as valid object: if out of four neighbouring pixels inside the candidate object, at least one pixel has a non-zero value; and if out of two neighbouring pixels outside the candidate object, at least one pixel has a zero value.

FIGS. 3(a)-3(f) illustrate an example implementation of the present invention.

FIG. 3(a) illustrates a base line image. FIG. 3(b) illustrates a current image comprising at least one object 301. FIG. 3(c) illustrates a delta image, said delta image comprising the at least one object 301.

After the baseline image is captured and stored, there could be some activities in the view of a surveillance camera. There could be some objects placed or removed, or a human can come into the view. The base image as well as current image is acquired by a camera interface &control module. In the present scenario, if the baselined image data is represented as [BI] and a current image data as [CI], the baseline image is subtracted from the current image to obtain the delta image data Δ[I].

$$\Delta[I] = abs([CI] - [BI]) \quad (1)$$

That is, for each Red, Green and Blue component (8-bits each) in each Pixel, if c_r, c_g and c_b represent the Red, Green and Blue component values of a pixel in the current image data [CI] and if b_r, b_g and b_b represent the Red, Green and Blue component values of a pixel in the baselined image data [BI], the delta values of Red denoted by Δr, delta values of Green denoted by Δg and delta values of Blue denoted by Δb are calculated as:

$$\Delta r_{ij} = |c\_r_{ij} - b\_r_{ij}| \quad (2)$$

$$\Delta g_{ij} = |c\_g_{ij} - b\_g_{ij}| \quad (3)$$

$$\Delta b_{ij} = |c\_b_{ij} - b\_b_{ij}| \quad (4)$$

[1] The delta pixel value, denoted by Δp will thus be:

$$\Delta p_{ij} = \Delta r_{ij} + \Delta g_{ij} + \Delta b_{ij} \quad (5)$$

Based on the threshold value, it will be determined if the pixel in the subtracted image has to be set to zero or a valid constant value. In one example, with a threshold value of 25 denoted by THRESHOLD_RGB for each delta values of Red, Green and Blue components and a cumulative threshold of 50 denoted by THRESHOLD_RGB SUM for the pixel comprising Red, Green and Blue components, the following conditional statement is used to set the delta pixel value to either zero or a constant value (in this case a value of 100).

```
If (each of Δ r_ij, Δ g_ij, Δ b_ij<THRESHOLD_RGB) OR
if (Δ p_ij<THRESHOLD_RGB_SUM)
    SetΔ p_ij = 0
Else
    SetΔ p_ij = CONST_VAL (say 100 for each of R, G, B)
```

The delta image thus obtained as shown in FIG. 3(c) will have stray noises/noise clusters 302 which might be unwanted non-zero value pixels or stray holes which are unexpected zero value pixels. This leads us to the next step of filtering stray noises and/or noise clusters from said delta image.

In one example, Mode-filter is applied to the subtracted/delta image. Mode-filter works by scanning the image for non-zero pixels and for each such pixel, it looks at the 8 neighbouring pixels and if the number of non-zero neighbours is less than 2, the current pixel value is erased, that is, it is set to zero value. This removes stray noise pixels, but does not remove larger noise clusters. In order to remove noise clusters, a more exhaustive noise filter and object smoothing method is applied on the delta image. The method is independently applied on X-axis and Y-axis. Each row in case of X-Axis or column in case of Y-Axis is scanned to find at-least two probable object parts or hit end of row. There could be more than two if the probable object widths or heights are small. For example, on X-Axis, if there are two object parts, one starting at pixel with x value of 13 and ending at pixel with x value of 35, another starting at pixel with x value of 121 and ending at x value of 167, then these points are marked. Then the density of zero value pixels, which is gaps between each probable objects are calculated.

In the above example, between pixel with x value of 35 and pixel with x value of 121, the gap is 85 pixels which is equal to a density of 54.8% of zero pixels. If the density of zeros is less than a threshold which is 20% according to the present embodiment, meaning low density of zeros, then the gap between the objects are assumed to be stray holes and are filled if and only if the absolute gaps are less than Minimum Gap Threshold of 4 pixels. Otherwise, if the gap cannot be filled, and if the object width or height in the current row or column as the case may be, is less than Minimum Object Threshold of 4 pixels, the probable object is considered as noise and the pixels values are set to zero. Otherwise, the pixels are retained as it is.

If the gap or zero density is high, as in the above example, and if the probable object is less than Minimum Object Threshold of 4 pixels, then the pixels values are set to zero. If it is greater than the threshold, the pixels are retained. The last valid object thus found, is used for continuing the scan of the respective row or column. In the above example, since the second object from pixel with x value of 121 to pixel with x value of 167 is valid object, it would be considered as the first object in the continuation of the scan from pixel with x value of 168 till another object is found or till end of row. This ensures a continuous application of the method and not in isolation on the sets of objects, between which the gap might have to be filled.

Finally, if only one probable object is found and end of row or column is reached, it has to be treated as a special case, and the same method is applied to remove stray noise or fill the gaps. Noise filter module applies noise filtering and object smoothening a second time since the first pass would have created small remnants of larger noise clusters. The resulting delta image is shown in 3(d).

FIG. 3(e) illustrates the delta image with the at least one object detected as a valid object, said valid object represented by reference numeral 303. The step of marking and traversing an object followed by the step of determining a valid object is further illustrated in FIG. 4. FIG. 3(f) illustrates the delta image wherein one or more pre-determined points are determined on the boundary of a valid object, said determination of one or more points further illustrated in FIG. 5.

Figure 4:
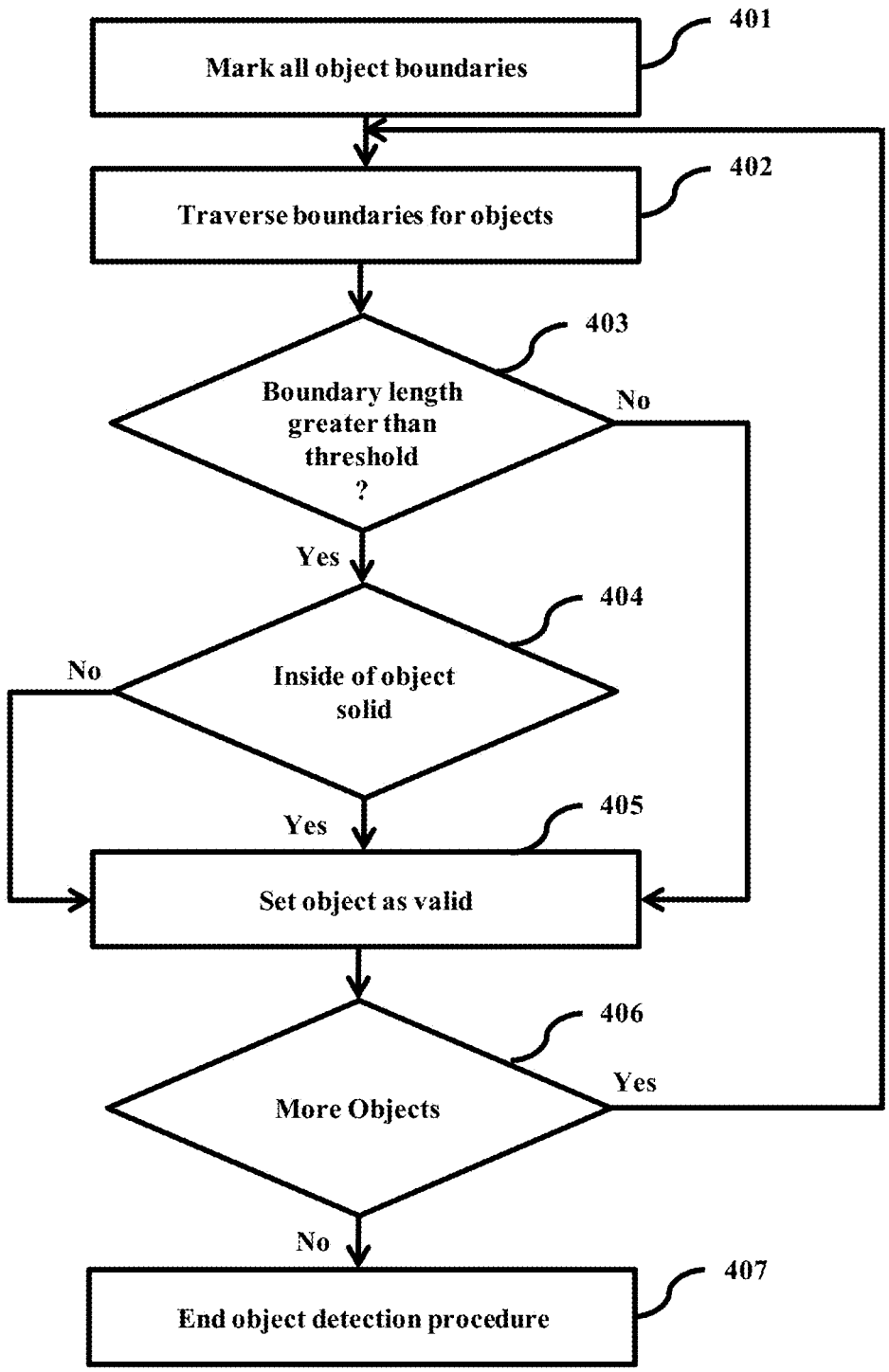
FIG. 4 illustrates the step of marking and traversing an object followed by the step of determining a valid object, in accordance with the embodiments of the present invention.

FIG. 4 illustrates the step of marking and traversing an object followed by the step of determining a valid object, in accordance with the embodiments of the present invention.

As shown in FIG. 4, at step 401, the method comprises marking all the object boundaries. At step 402, the method comprises traversing boundary for at least one object. At step 403, the method comprises determining if a length traversed along the boundary of said at least one object is greater than a pre-determined threshold value. If yes, the method comprises determining if an interior region/inside of said at least one object is detected as being solid at step 404. If no, the method moves to step 406 of determining more objects. If at step 404, the interior region of said object is determined to be solid, the object is set as a valid object as shown at step 405. If at step 404, the interior region of said object is determined not to be solid, the method moves to step 406 of determining more objects.

Elaborating on the method illustrated in FIG. 4 with the help of an example, an object boundary marking module scans each row of the delta image and for every non-zero pixel which has a zero pixel either on the left, right, bottom or top is marked. Special conditions are applied for pixels on the edges of the image. The corners are addressed additionally and marked since the non-zero pixel and the corner pixel surrounding this would be on a diagonal. Thereafter, an object boundary traversal module scans the delta image to find a marked pixel and if found, it is set as the starting pixel and the valid object detection method starts. The object boundary traversal module traverses the boundary of the object by looking for the next neighbouring marked pixel which is marked in the previous step and it should return to the starting pixel to count it as one valid object. If there are dead ends, the method traces back and finds other paths to continue the traversal. It changes marked boundary pixels to unmarked pixels so that no further traversals happen again on this boundary. The object boundary traversal module stops boundary traversal when there are no further pixels to traverse or it has reached the starting point. The object boundary traversal module also captures the path traversed and stores the (x, y) coordinates of the boundary pixels for further use. The object boundary traversal module also computes the boundary length during traversal which is returned back when this method ends. During the boundary traversal, the method locates and stores the minimum and maximum pixels occurring on X and Y direction and stores its (x, y) coordinates, this gives the object bounds. The traversal is always counter-clockwise.

Thereafter, an object validity detection module uses the boundary length returned by the object boundary traversal module to test if it is greater than a threshold of 25. If the answer is "Yes", then the next step is to determine whether the inside is solid or hollow. The object validity detection module takes the extrema pixels corresponding to Minimum and Maximum on X-axis and Y-axis of the object, and for each of these extrema pixels, the two pixels inside the object are checked for non-zero value and one pixel outside the object on the same axis is checked for zero value. For example, if the minimum value of the object on the X-axis occurs at pixel (43, 76) and maximum value of the object on the X-axis occurs at pixel (112, 42), then for the minimum extrema pixel (43, 76), it takes the two inside pixels at (44, 76) and (45, 76) and the outside pixel at (42, 76). For the maximum extrema pixel (112, 42), it takes the two inside pixels at (111, 42) and (110, 42) and the outside pixel at (113, 42). Out of a maximum of 4 such extrema pixels on X-axis and Y-axis, if the test for non-zero of inside pixels is successful for at least one extrema pixel, and the test for outside pixel for zero is successful for at least one extrema pixel, then the inside of the candidate object is confirmed to be Solid. If the checks fail, it would mean that the object is hollow. For example, if a ring is an object, then there would be two sets of boundary traversals, one on the external boundary and one on the internal boundary. So, there are two candidate objects. However, the above checks will fail for the inner boundary and hence it would not be considered as a solid object. Yet another check, object validity detection module invalidates the object if it is determined to be a part of other object bounds already found. On the other hand, if other objects are part of this object bounds, then this bigger object is made valid. If the interior region of object is determined to be solid, the object is set as a valid object by the object validity detection module. Also, if there are more objects, the steps are repeated from traversal of objects at step 402. The procedure ends at step 407 if there are no more objects boundaries to be traversed. The delta image after the detection of a valid object is shown in 3(e) with its boundaries shown in green.

Figure 5:
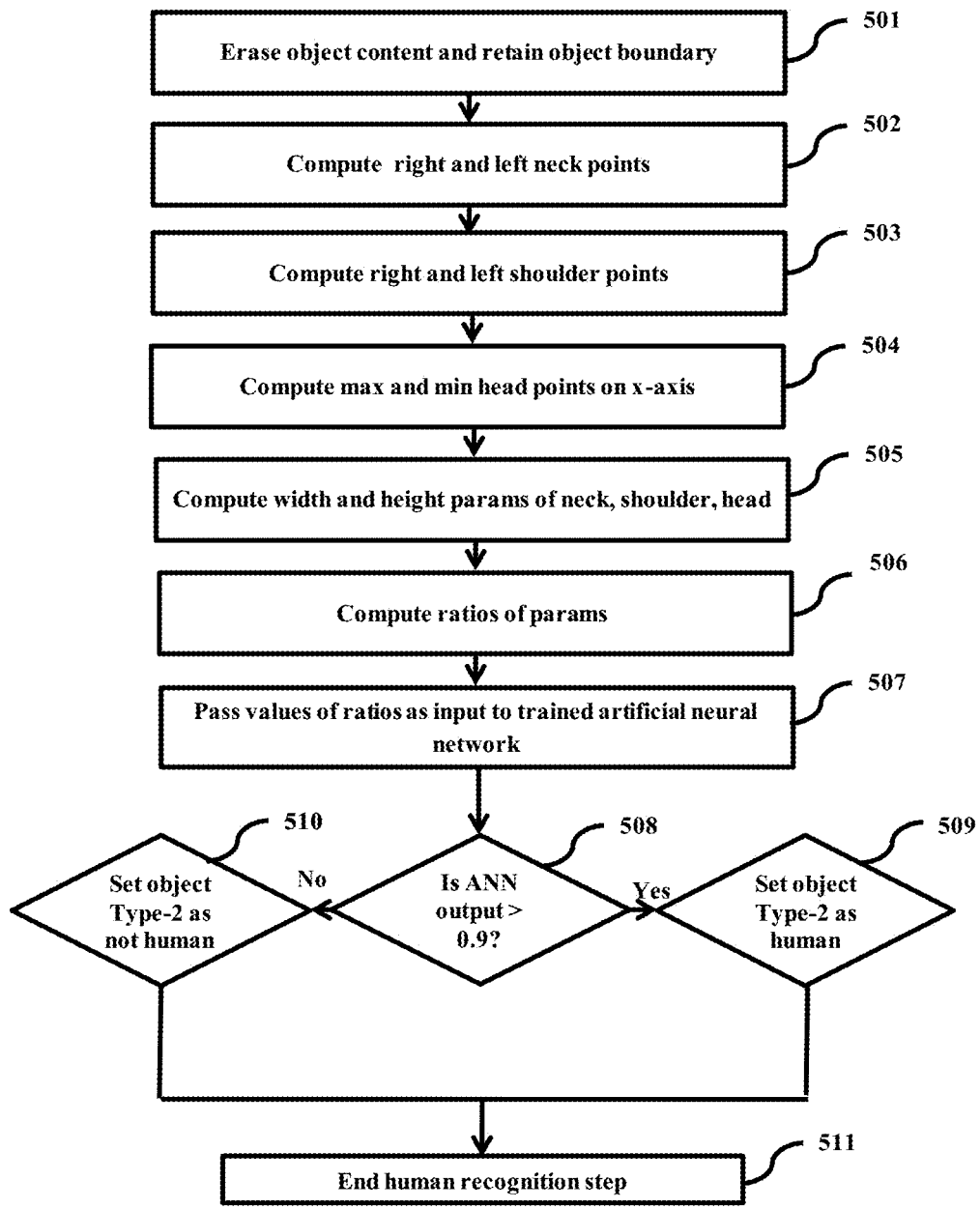
FIG. 5 illustrates the step of human detection, in accordance with step 105, 106 and 107 of method 100 of the present invention.

FIG. 5 illustrates the step of human detection, in accordance with step 105, 106 and 107 of method 100 of the present invention.

Subsequent to the step of detection of at least one valid object as illustrated in FIG. 4, the method comprises erasing object content and retain object boundary at step 501. At step 502, 503 and 504, the method comprises computing pre-determined points on the object detected as valid object. At step 502, the method comprises computing right and left neck points. At step 503, the method comprises computing right and left shoulder points. At step 504, the method comprises computing maximum and minimum head points on X axis. Based on the data obtained at step 502, 503 and 504, the method comprises computing pre-determined parameters at step 505. The pre-determined parameters may include parameters in relation to shoulder, neck and head of the valid object. At step 506, the method comprises computing ratios of said pre-determined parameters. At step 507, the method comprises processing the said ratios wherein said processing comprises passing value of ratios as inputs to a trained artificial neural network. At step 508, the method comprises determining if the output of said trained neural network is greater than a pre-determined ratio. If yes, the valid object is set as a human as shown at step 509. If no, the valid object is set as not human as shown at step 510. Subsequent to the determination if the valid object is a human or not human, the method 500 comprises to an end as shown at step 511.

Elaborating on said method with the help of an example, a human feature extraction module computes the right and left neck points. It involves first finding the top of the head, head top y, which is the maximum Y of the object. In case, there are multiple pixels with the same maximum Y, then the mid-point of the minimum X and maximum X at maximum Y is taken as the top of the head.

Finding the neck points involve coordinate transformation and calculating new Y'. For the new coordinate axis, the head-top will be one end point and the other end point will be the pixel corresponding to the minimum and maximum X of the object for right and left neck respectively.

In a normal position of the human head, the minimum and maximum X would occur at almost the same Y, either at the shoulder or below, but assuming the probable human is not in the normal position, then the left and right min/max of the object are at different heights, so the coordinates at the minimum height, Y corresponding to minimum and maximum X of the object are taken as the end points of the new coordinate axis. These can be termed as right-most and left-most points.

For Right neck point determination, the end points of the new coordinate axis are head-top pixel (x, y) and right-most pixel (x, y). And for Left neck point determination, the end points of the new coordinate axis are head-top pixel (x, y) and left-most pixel (x, y).

The boundary points to traverse to calculate new Y' is from head top to right-most pixel or left-most pixel. Note that the boundary pixels of the objects are stored in an array while traversing the object boundary for detection of the object.

The human feature extraction module calculates the new Y' in the new coordinate axis for each pixel (x, y) from head-top to right-most or left-most pixel of the object. It further calculates the required local minima falling within range of a probable neck point. The Y value (in the original coordinate axis) of the neck point on the right and left can be termed as right neck y and left neck y, respectively. Similarly, the X value can be termed as right neck x and left neck x, respectively.

In most cases, the neck points found on the right and left side occurs at a different Y. So for each of the right and left neck points found, the other end point of this neck (or the mirror of the right neck point on the left side and left neck point on the right side) on the object boundary is found. For the right neck point found, this would be right neck mirror x and for the left neck point found, this would be left neck mirror x, the Y value being same for the original and the mirror point. The widths of these 2 sets are averaged to get the neck width. And the Y point of the neck (used for head height computation) is the average of Y of the right and left neck points.

$$\text{neck width at right point} = \text{abs}(\text{right neck } x - \text{right neck mirror } x) \quad (6)$$

$$\text{neck width at left point} = \text{abs}(\text{left neck } x - \text{left neck mirror } x)$$

$$\text{Average neck width} =$$

$$\frac{\text{neck width at right point} + \text{neck width at left point}}{2}$$

In step 503, a human feature extraction module computes right and left shoulder points. For this, instead of head-top as one of the end points of the new coordinate axis, the neck points on the respective sides are used for right and left shoulder points. The other end point is the same as the end point used in neck point determination, that is, the right-most and left-most points.

The new Y' is calculated for each pixel from the right neck pixel to the right-most pixel and left neck pixel to the left-most pixel. From the new Y', the local maxima which occurs first is taken as the shoulder point. The Y value (in the original coordinate axis) of the shoulder point on the right and left can be termed as right shoulder y and left shoulder y, respectively. Similarly, the X value can be termed as right shoulder x and left shoulder x, respectively.

As in the case of neck, in most cases, the shoulder points found on the right and left side occurs at a different Y. So for each of the right and left shoulder points found, the other end point of this shoulder (or the mirror of the right shoulder point on the left side and left shoulder point on the right side) on the object boundary is found. For the right shoulder point found, this would be right shoulder mirror x and for the left shoulder point found, this would be left shoulder mirror x, the Y value being same for the original and the mirror point. The widths of these 2 sets are averaged to get the shoulder width. And the Y point of the shoulder (used for shoulder height computation) is the average of Y of the right and left shoulder points.

$$\text{shoulder width at right} = \text{abs}(\text{right shoulder } x - \text{right shoulder mirror } x) \quad (7)$$

$$\text{shoulder width at left} = \text{abs}(\text{left shoulder } x - \text{left shoulder mirror } x)$$

$$\text{Average shoulder width} = \frac{\text{shoulder width at right} + \text{shoulder width at left}}{2}$$

$$\text{shoulder height} = \text{head top } y - \frac{(\text{right shoulder } y + \text{left shoulder } y)}{2} \quad (8)$$

The delta image with the right and left neck points connected, right and left shoulder points connected, along with head-top and the new coordinate axis used are shown in FIG. 3(e).

In step 504, with neck points having been found, the human feature extraction module computes the head width by finding the maximum and minimum X in the probable head region. This involves traversing from head-top to right and left necks points and finding head maximum x and head minimum x respectively.

$$\text{head width} = \text{head maximum } x - \text{head minimum } x \quad (9)$$

$$\text{head height} = \text{head top } y - \frac{(\text{right neck } y + \text{left neck } y)}{2} \quad (10)$$

In step 505, the human feature extraction module computes the width and height parameters of neck, shoulder and head as shown in equations 6 through 10.

In step 506, the human feature extraction module computes the ratios of the parameters obtained in the previous step. It involves computing the ratios of Head width to neck width, Shoulder width to head width, Shoulder width to neck width, Head height to head width and Shoulder height to head height.

In step 507, the values of each ratios is passed to an instance of a first artificial neural network module with 5 inputs layer nodes corresponding to the values of 5 ratios as feature values, 10 hidden layer nodes and 1 output node (to determine whether its human or not) which is already trained with data sets of objects comprising both human and non-humans with the above feature values computed. Each node has a sigmoid activation function and each node between successive layers is inter-connected with its own weights, the values of which are random to start with and gets adjusted by back-propagation algorithm during the training phase. The first artificial neural network module uses the weights saved in a first weight storage section, which are the trained weights to obtain the result at the output node, for the set of 5 inputs.

In step 510, there is a test which determines the object to be human if the output of the artificial neural network module is greater than 0.9 and determines it to be non-human if the output of the artificial neural network module is less than 0.9. This concludes the Human Recognition procedure which returns the value of the Object indicating whether it is human or not human. If there are no further valid objects, the method 500 concludes.

FIG. 6 illustrates the step of human detection, in accordance with step 206 and 207 of method 200 of the present invention.

Subsequent to the step of detection of at least one valid object as illustrated in FIG. 4, the method comprises erasing object content and retain object boundary at step 601. At step 602, the method comprises erasing the interior region of said valid object and segmenting the boundary of said valid object into a pre-determined number of blocks. At step 603, the method comprises computing boundary pixels and density in each block. At step 604, the method comprises processing the boundary features i.e., pass values of all blocks as input to a trained artificial neural network. In one example, if the value of output is greater than a pre-determined value as shown at step 605, the object is set as human. However, if the value of output is less than a pre-determined value as shown at step 606, the object is set as not human. If there are no further valid objects, the method 600 concludes at step 607.

Elaborating on said method with the help of an example, In step 602, an object boundary feature extraction module takes the object which has only the boundary pixel data and segments into 5 parts each on X and Y axis, totalling 25 blocks. If the block is too small relative to the resolution (<10 pixels each side for a 320×240 resolution as in the present embodiment), the object is ignored as it is not likely a human.

In step 603, for each block, the object boundary feature extraction module computes the boundary pixel density. The count of the number of boundary pixels in each block is divided by the length of the diagonal of the block (or can be area of the block) to make it scale independent as well as obtaining value range suitable for Artificial Neural Network.

In step 604, the values for each block is passed to an instance of the second artificial neural network module with 25 inputs layer nodes corresponding to the values of 25 blocks, 30 hidden layer nodes and 1 output node (to determine whether its human or not) which is already trained with data sets of objects comprising both human and non-humans with the above parameters extracted. Each node has a sigmoid activation function and each node between successive layers is inter-connected with its own weights, the values of which are random to start with and gets adjusted by back-propagation algorithm during the training phase. The artificial neural network module uses the weights saved in a second weight storage module, which are the trained weights to obtain the result at the output node, for the set of 25 inputs. In step 605, there is a test which determines the object to be human if the output of the artificial neural network module is greater than 0.9 and determines it to be non-human if the output of the artificial neural network module is less than 0.9 as shown at step 606.

Figure 7A:
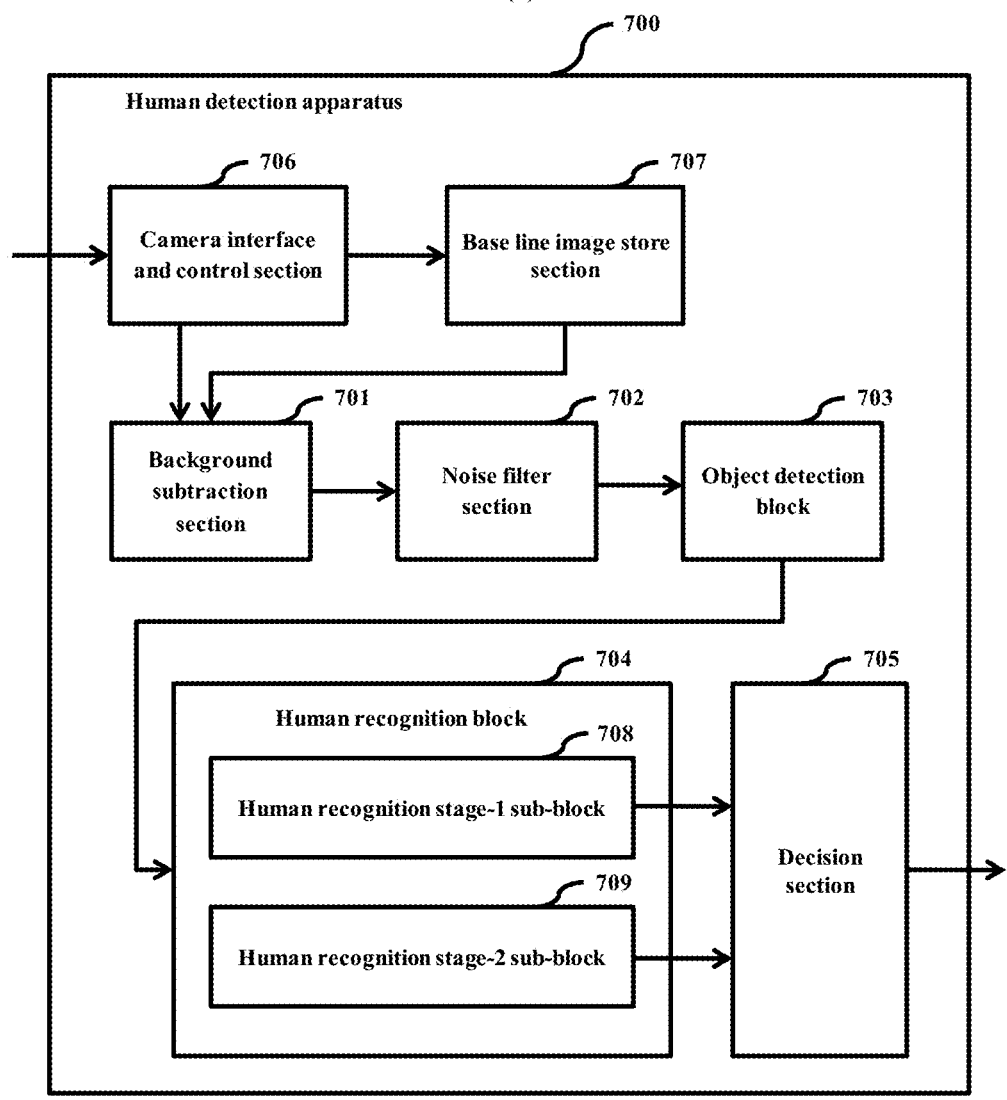
FIG. 7(a) illustrates the apparatus 700 for implementation of method 100 and 200, in accordance with the present invention.
Figure 7B:
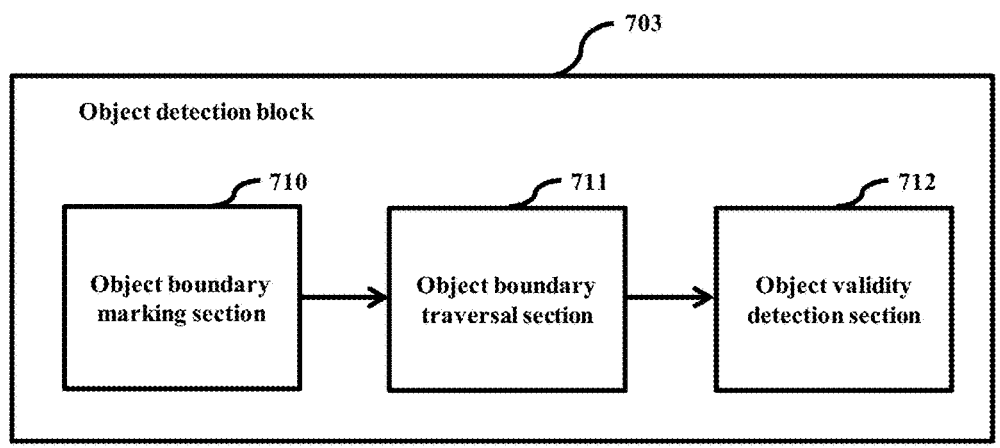
FIG. 7(b) illustrates an object detection block in the apparatus 700, in accordance with present invention.
Figure 7:
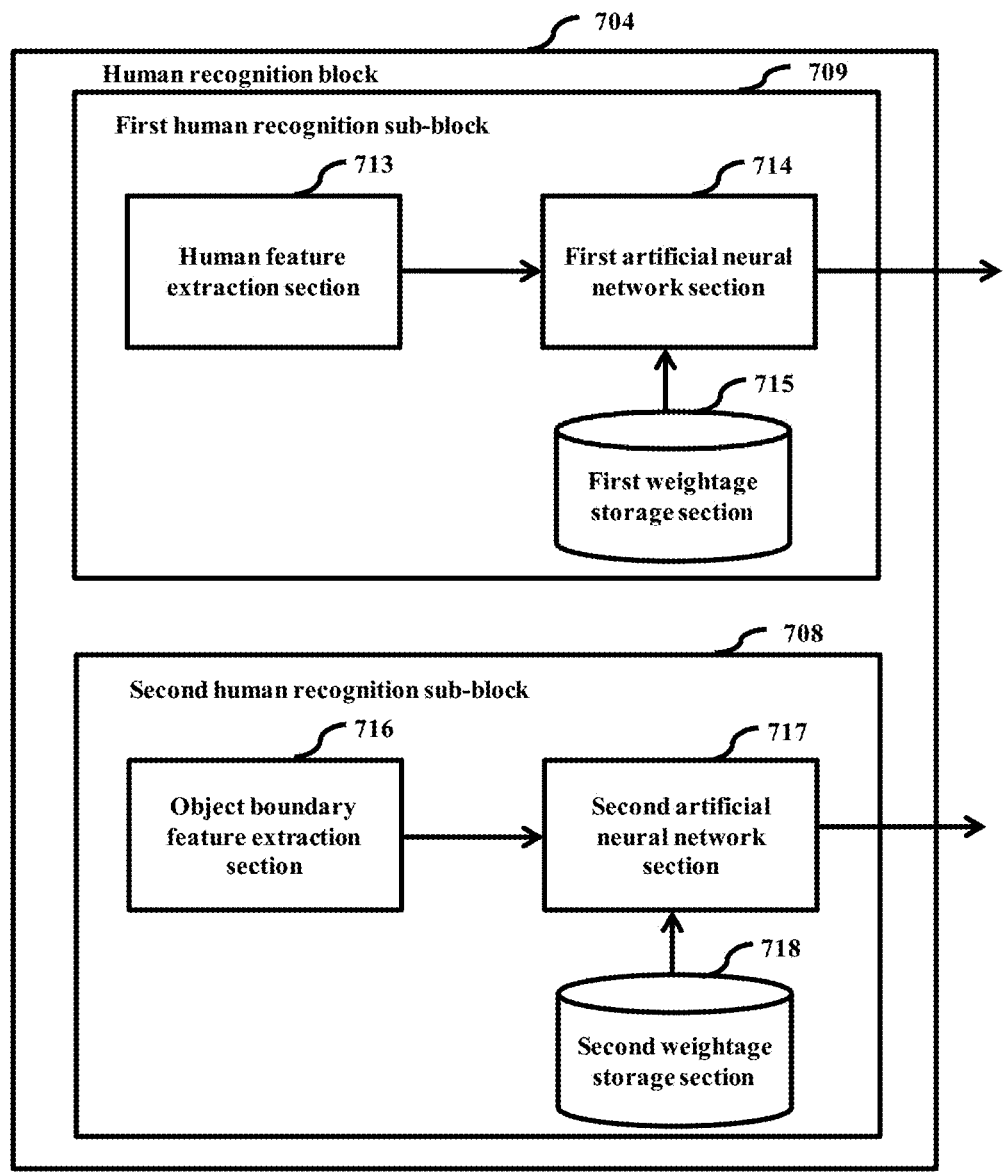
FIG. 7(c) illustrates a human recognition block in the apparatus 700, in accordance with the present invention.

FIG. 7(*a*) illustrates the apparatus 700 for implementation of method 100 and 200, in accordance with the present invention.

The apparatus 700 includes a processor (not shown) to execute step of methods 100 and 200, an Input/output (I/O) interface (not shown) coupled to the processor, and a memory (not shown) coupled to the processor comprising a plurality of modules/blocks/sections capable of being executed by the processor.

FIG. 7(*a*) illustrates the apparatus 700 comprising a background subtraction module 701, a noise filter module 702, an object detection module 703, a human recognition module 704 and a decision section module 705. The apparatus may further comprise a camera interface and control module 706 and a baseline image storage module 707. The human recognition block may further comprises a first human recognition sub-block 708 for implementation of method 100 of the present invention and/or a second human recognition sub-block 709 for implementation of method 200 of the present invention.

For implementation of method 100, the background subtraction module 701 is configured for subtracting a current image from a baseline image to obtain a delta image, said delta image comprising at least one object. The noise filter module 702 is configured for filtering stray noises and/or noise clusters from said delta image. The object detection module 703 is configured for marking and traversing the boundary of said at least one object. The object detection block 703 is further configured for determining the at least one object as valid object: if a length traversed along the boundary of said at least one object is greater than a pre-determined threshold value; and if an interior region of said at least one object is detected as being solid. The human recognition block 704 is configured for erasing the interior region of said at least one object and determining one or more pre-determined points on the boundary of said valid object. The human recognition block 704 is further configured for determining one or more pre-determined parameters corresponding to said pre-determined points and ratio thereof. The human recognition block 704 and the decision module 705 are configured for processing the ratios to identify if the object is a human being or not.

For implementation of method 200, the background subtraction section 701 is configured for subtracting a current image from a baseline image to obtain a delta image, said delta image comprising at least one object. The noise filter module 702 is configured for filtering stray noises and/or noise clusters from said delta image. The object detection module 703 is configured for marking and traversing the boundary of said at least one object. The object detection module 703 is further configured for determining the at least one object as valid object: if a length traversed along the boundary of said at least one object is greater than a pre-determined threshold value; and if an interior region of said at least one object is detected as being solid. The human recognition block 704 is configured for erasing the interior region of said valid object and segmenting the boundary of said valid object into a pre-determined number of blocks. The human recognition block 704 and the decision module 705 are further configured for extracting and processing the boundary features of said valid object to identify if the object is a human being or not.

FIG. 7(b) illustrates an object detection block in the apparatus 700, in accordance with present invention.

FIG. 7(b) illustrates an object detection block 703, said object detection block comprising an object boundary marking section 710, an object boundary traversal section 711 and an object validity detection section 712. The object boundary marking section 710 is configured for marking at least one object in the delta image. The object boundary traversal section 711 is configured for traversing at least one object in the delta image. The object validity detection section 712 is configured for determining the at least one object as a valid object.

FIG. 7(c) illustrates a human recognition block in the apparatus 700, in accordance with the present invention.

FIG. 7(c) illustrates a human recognition block 704 comprising the first human recognition sub-block 708 and/or the second human recognition sub-block 709. The first human recognition sub-block 708 further comprises a human feature extraction section 713, a first artificial neural network module 714 and a first weight storage section 715. The human feature extraction section 713 and extracts features pertaining to human and uses artificial neural network with back propagation of errors with weights obtained after training with the respective feature set.

The second human recognition sub-block 709 further comprises an object boundary feature extraction section 716, a second artificial neural network module 717 and a second weight storage section 718. The object boundary feature extraction section 716 extracts boundary features pertaining to human and uses artificial neural network with back propagation of errors with weights obtained after training with the respective feature set.

While certain present preferred embodiments of the invention have been illustrated and described herein, it is to be understood that the invention is not limited thereto. Clearly, the invention may be otherwise variously embodied, and practiced within the scope of the following claims.

What is claimed:

1. A computer-implemented method for human detection in images, the method comprising:
    subtracting, by a background subtraction module, a current image from a baseline image to obtain a delta image, the delta image comprising at least one object;
    filtering, by a noise filter module, stray noises and/or noise clusters from the delta image;
    marking, by an object detection module, and traversing a boundary of the at least one object;
    determining, by the object detection module, the at least one object as a valid object:
        if a length traversed along the boundary of the at least one object is greater than a pre-determined threshold value; and
        if an interior region of the at least one object is detected as being solid;
    erasing, by a human recognition block, the interior region of the at least one object and determining one or more pre-determined points on the boundary of the valid object;
    determining, by the human recognition block, one or more pre-determined parameters corresponding to the one or more pre-determined points and ratios thereof;
    processing, by the human recognition block and a decision module, the ratios to identify if the at least one object is a human being or not.

2. The method as claimed in claim 1, wherein the step of subtracting further comprises assigning, based on a pre-determined threshold value, pixels in the delta image a zero or a valid constant value.

3. The method as claimed in claim 1, wherein the step of filtering stray noises comprises:
    determining, for each non-zero pixel of the delta image, number of neighbouring pixels having a non-zero pixel value and setting the non-zero pixel to a zero value if number of neighbouring pixels having a non-zero value is less than a pre-determined value.

4. The method as claimed in claim 1, wherein the step of filtering noise clusters comprises:
    determining the zero pixel density in a gap between two adjacent objects;
    comparing the zero pixel density in the gap with a pre-determined minimum gap threshold value; and
    altering the value of pixels in the gap from a zero to a non-zero value if the zero pixel density in the gap is less than a pre-determined minimum gap threshold value.

5. The method as claimed in claim 4, wherein the step of filtering noise clusters further comprises:
    comparing the zero pixel density in the gap with a pre-determined minimum gap threshold value;
    determining the height or width of the at least one object at end points of the gap;
    altering the value of pixels in the at least one object from a non-zero value to a zero value if the height or width of the at least one object at end points of the gap is less than a pre-determined minimum object threshold value and zero pixel density is greater than the pre-determined gap threshold value.

6. The method as claimed in claim 1, wherein the step of marking and traversal comprises:
    determining extrema pixels of the at least one object on X axis and Y axis;
    marking a starting point from among the extrema pixels and traversing along the boundary of the at least one object to return to the starting point.

7. The method as claimed in claim 1, wherein the step of identifying if an interior region of the at least one object is detected as being solid comprises:
    identifying extrema pixels of the at least one object on X axis and Y axis;
    identifying at least two successive pixels for each extrema pixel inside the at least one object along the respective X and Y axis;
    identifying at least one neighbouring pixel for each extreme pixel outside the at least object along the respective X and Y axis;
    determining the at least one object as valid object:
        if out of four neighbouring pixels inside the candidate object, at least one pixel has a non-zero value; and
        if out of two neighbouring pixels outside the candidate object, at least one pixel has a zero value.

8. The method as claimed in claim 1, wherein the pre-determined points comprises:

top of a head;
right and left neck points;
right and left shoulder points; and
maximum and minimum head points on X axis.

9. The method as claimed in claim 1, wherein the pre-determined parameters comprises:
width of a neck;
width of a shoulder;
height from a shoulder to top of a head;
width of a head; and
height from neck to top of a head.

10. The method as claimed in claimed in claim 1, wherein the step of processing comprises inputting the ratios to an artificial neural network.

11. The method as claimed in claim 1 further comprising:
erasing the interior region of the valid object and segmenting the boundary of the valid object into a pre-determined number of blocks;
extracting and processing boundary features of the valid object to identify if the at least one object is a human being or not.

12. A computer-implemented method for human detection in images, the method comprising:
subtracting, by a background subtraction module, a current image from a base image to obtain a delta image, the delta image comprising at least one object;
filtering, by a noise filter module, stray noises and/or noise clusters from the delta image;
marking and traversing, by an object detection module, a boundary of the at least one object;
determining, by the object detection module, the at least one object as a valid object:
if a length traversed along the boundary of the at least one object is greater than a pre-determined threshold value; and
if an interior region of the at least one object is detected as solid;
erasing, by a human recognition block, the interior region of the valid object and segmenting the boundary of the valid object into a pre-determined number of blocks;
extracting and processing, by the human recognition block and a decision module, boundary features of the valid object to identify if the at least one object is a human being or not.

13. An apparatus for human detection in images, the apparatus comprising:
a processor;
a memory coupled to the processor, wherein the memory comprises a plurality of modules capable of being executed by the processor to perform operations, the plurality of modules comprising:
a background subtraction module configured for subtracting a current image from a baseline image to obtain a delta image, the delta image comprising at least one object;
a noise filter module configured for filtering stray noises and/or noise clusters from the delta image;
an object detection module configured for marking and traversing a boundary of the at least one object;
the object detection module further configured for determining the at least one object as valid object:
if a length traversed along the boundary of the at least one object is greater than a pre-determined threshold value; and
if an interior region of the at least one object is detected as being solid;
a human recognition module configured for erasing the interior region of the at least one object and determining one or more pre-determined points on the boundary of the valid object;
the human recognition module configured for determining one or more pre-determined parameters corresponding to said the one or more pre-determined points and ratios thereof;
the human recognition module and a decision module configured for processing the ratios to identify if the at least one object is a human being or not.

14. An apparatus for human detection in images, the apparatus comprising:
a processor;
a memory coupled to the processor, wherein the memory comprises a plurality of modules capable of being executed by the processor to perform operations, the plurality of modules comprising:
a background subtraction module configured for subtracting a current image from a base image to obtain a delta image, the delta image comprising at least one object;
a noise filter module configured for filtering stray noises and/or noise clusters from the delta image;
an objection detection module configured for marking and traversing a boundary of the at least one object;
the object detection module further configured for determining the at least one object as valid object:
if a length traversed along the boundary of the at least one object is greater than a pre-determined threshold value; and
if an interior region of the at least one object is detected as solid;
a human recognition module configured for erasing the interior region of the valid object and segmenting the boundary of the valid object into a pre-determined number of blocks;
the human recognition module configured for extracting and processing boundary features of the valid object to identify if the at least one object is a human being or not.

* * * * *